Feb. 10, 1970   S. M. DOWNS ET AL   3,494,094
CONTAINER CLOSURE AND METHOD OF SEALING CONTAINERS
Filed June 23, 1967

INVENTOR.
SAMUEL M. DOWNS
JACK M. WHEATON
BY J.R. Nelson and
W.A. Scheich
ATTORNEYS 3,494,094
CONTAINER CLOSURE AND METHOD OF
        SEALING CONTAINERS
Samuel M. Downs, Greenwich, Conn., and Jack M.
   Wheaton, Toledo, Ohio, assignors to Owens-Illinois,
   Inc., a corporation of Ohio
Continuation-in-part of application Ser. No. 476,303,
   Aug. 2, 1965. This application June 23, 1967, Ser.
   No. 653,297
           Int. Cl. B67c 7/00; B67b 3/02
U.S. Cl. 53—27                                   9 Claims

ABSTRACT OF THE DISCLOSURE

The invention relates to a method of closing and sealing containers and to the closure per se. In the manufacture of glass containers, a plastic cover cap liner is applied (snapped on) over the glass finish to protect the container from foreign particle infiltration. Just prior to filling the container with product, the cap liner is removed, the container is filled, and a cover cap liner is reapplied, closing the container. A rigid (metal) cover cap is telescoped over the cap liner at a subsequent capping station, and the cover cap crimped or deformed to sealingly secure the cap on the container. The closure comprises the two pieces of the plastic snap-on cap liner and the telescopic outer metal cover cap that is deformed on the container finish to seal the container.

---

This application is a continuation-in-part of application Ser. No. 476,303, filed Aug. 2, 1965, now abandoned.

Our invention relates to container closures and methods of sealing containers. More particularly, we are concerned with the provision of novel, inexpensive means for maintaining the initial substantially commercial sterility of newly fabricated containers, glass bottles, for example, and protecting them from contamination resulting from entry thereinto of foreign matter, such as dust, carton fiber, etc. during general handling between the container fabricating plant and the packer's filling line, thus relieving the packers of the very considerable expense of washing the containers preparatory to filling and closing them. We thereby save the packers the initial investment in the washing apparatus, as well as the cost of maintenance and operation and conserve floor space, as is apparent.

Heretofore efforts to attain the advantages of our invention have very largely been most unsatisfactory, if not complete failures, in that, for example, the final closure caps which were to be used ultimately in hermetically sealing the bottles were initially applied to the containers at the annealing lehr to function first as dust-caps, then removed by the packer to permit bottle filling and finally reapplied by them to seal the containers. Mix-up incident to removal and reapplication of the caps was a common and unavoidable consequence. Also the expense of providing special capping apparatus in the container manufacturing plant would be prohibitive. Alternatively, dust-caps have been applied at the glass manufacturer's annealing lehr and later discarded completely by the bottlers or packers, or in some instances returned to the glass manufacturer for washing and reuse. These procedures were most unsatisfactory because of the high cost and obvious general inconvenience.

An important object of our invention, therefore, is the provision of simple, easily usable means for accomplishing in practical fashion the desired but heretofore unattained basic results of the above procedure, without any added cost over that common in a given commercial operation as practiced today.

It is also an object of our invention to provide a combined dust-cap and cover cap liner, which is affixed to a newly fabricated container while substantially commercially sterile at the fabricator's plant and remains so affixed until just prior to the container filling step where it is removed, sterilized in bulk or otherwise, where necessary, and reapplied to the filled container and securely held thereon by means of a rigid cover cap.

Other objects will be in part apparent and in part pointed out hereinafter.

In the accompanying drawings forming a part of our application:

Figure 3:
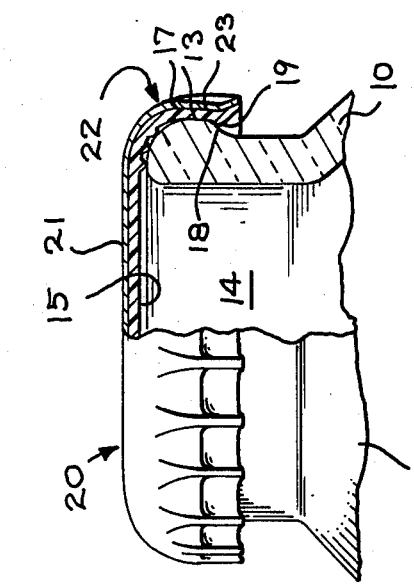
FIG. 3 is a view like FIG. 2, but with the cover cap telescoped over the dust-cap and secured together so that the latter becomes a liner for the cover cap.
Figure 2:
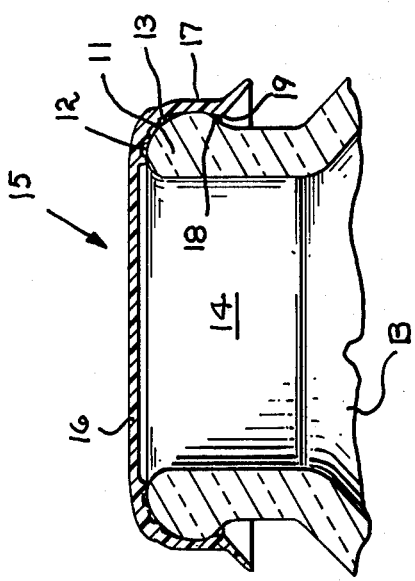
FIG. 2 is a fragmentary detail sectional view of our combined dust-cap and cover cap liner being used solely as a dust-cap for a commercially sterile bottle.

In the illustrated embodiment of our invention which incorporates some features in common with that forming the subject of our copending U.S. application for patent, Ser. No. 476,276, filed Aug. 2, 1965, now abandoned, the container is a glass bottle B having a neck 10, surmounted by an annular rim 11 creating both top and exterior side sealing surfaces 12 and 13 respectively and defining the mouth opening 14 of the bottle.

At the fabricating plant the bottles, while still relatively warm and commercially sterile, at the discharge end of the annealing lehr, are closed by means of a combined dust-cap and cover cap liner 15. The combined dust-cap and cover cap liner 15 is constructed of a material such that it is soft enough to seal on the glass finish at either of the sealing surfaces 12 and 13 provided thereon; yet resilient or pliable enough to snap into place and take up any tolerances in the glass finish to retain the cap liner in place after it is applied. As preferred examples, the cap liner 15 may be formed of polyethylene, vinyl materials including plasticized polyvinyl chloride, combinations of vinyl chloride-vinyl acetate and like compounds now available, and the butydiene-styrene injection moldable rubbers, or similar elastomeric or thermoplastic materials. The cap liner 15 comprises a disk-like top wall 16 or panel and a depending annular attaching skirt 17 and, if desired, may incorporate the specific structure of the cap shown in our copending application above identified, viz, the internal annular ribs on the panel and the thickened areas of the skirt, etc. As in the copending application, the rim 11 curves downwardly and inwardly to provide a cap retaining shoulder 18 for engagement with the internal annular holding bead 19 at the lower margin of the dust-cap skirt.

As indicated in FIG. 3, a rigid final cover cap 20 comprising a top wall 21 or panel and an annular depending attaching skirt 22, ultimately is telescoped over the dust-cap 15, transforming the latter into a liner for the cover cap 20 in order to hermetically seal the bottle. This cover cap may be a conventional crown-type cap or a tear-off type cap, or otherwise. We do not contemplate restricting the scope of our invention in this regard. If a crown cap is used, it is clear, as in the copending application, that the skirt corrugations 23 can function to interlock the two nested caps so they can be removed from the bottle as a unit. If preferred, there may be an adhesive, heat sensitive, which will bond the top walls or panels of the caps together.

Figure 1:
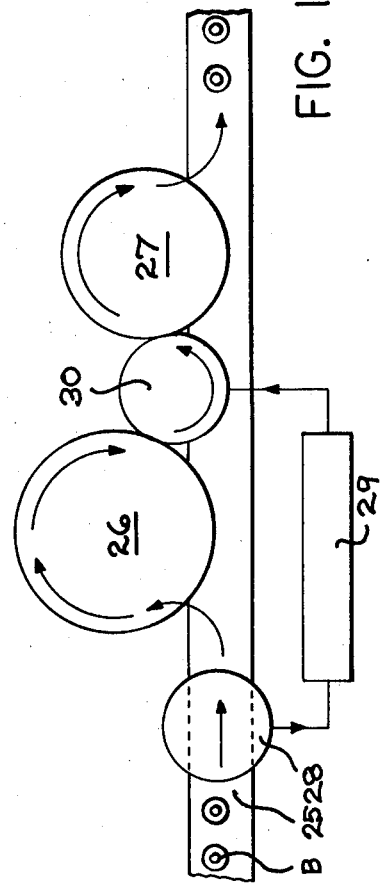
FIG. 1 is a view diagrammatically illustrating the steps involved in practicing our method.

In FIG. 1, we have indicated the successive steps involved in practicing our novel method. Bottles, or other empty containers B, which have been closed by means of the dust-caps described from the time they left the annealing lehr, are placed upright upon a continuously moving horizontal conveyor 25, which extends alongside a conventional filler (not shown) at a filling station 26, thence to and beyond a conventional capper (not shown) at a final capping station 27. These dust-caps are removed at the cap-removing station 28 by any well known means (not shown) and the open empty bottles enter the filling station 26. The removed dust-caps may move through a conventional sterilizer unit 29 or may be sterilized and handled in bulk and thence are fed to the dust-cap reapplication station 30 where they are again snapped onto the bottles, now filled. Thereupon the bottles move to the capping station 27 where the rigid cover caps 20 are telescoped over the dust-caps which now become permanent liners for the complete cover cap, effecting an hermetic seal for the container. The attaching skirt of the cover cap is or may be deformed to effectively secure the cap to the container. Such step may also join the two caps together so that they will be removable as a unit from the container. If preferred, the dust-cap may be a vinyl material with a vinyl lacquer coating (not shown) on its outer surface. Momentary exposure to heat will, of course, impart tackiness to the coating and bond the two caps together.

Modifications may be resorted to within the spirit and scope of the appended claims.

We claim:

1. The method which consists in closing the mouth-opening of a newly fabricated commercially sterile container with a combined dust-cap and cover cap liner, removing the dust-cap just prior to filling the container with a product, filling the container, reapplying a dust-cap to a filled container, telescoping a cover cap over the dust-cap, and securing both caps to the container, thereby hermetically sealing the latter and utilizing the dust-cap as a liner for the cover cap.

2. The method defined in claim 1, and securing the caps together so they are removable as a unit from the container.

3. The method which consists in closing the mouth-opening of newly fabricated commercially sterile containers with snap-on type combined dust-caps and cover cap liners, removing the dust-caps preparatory to placing a product in the containers, commercially sterilizing the removed caps, placing a product in the containers, affixing the sterilized caps to the containers, telescoping rigid cover caps over the dust-caps and securing the cover caps to the containers thereby to hermetically seal them.

4. The method defined in claim 3, and attaching the dust-caps to the cover caps concurrently with securing the latter to the containers.

5. The method defined in claim 3, and joining the caps together so they are removable as a unit from the containers.

6. The method defined in claim 3, and adhesively bonding the applied dust-caps and cover caps together.

7. The method which consists in closing the mouth-opening of newly fabricated commercially sterile bottles with snap-on type combined dust-caps and cover cap liners, conveying the bottles to a filling station and thence to a capping station, removing the combined dust-caps and cover cap liners from the bottles just ahead of the filling station, filling the bottles, conveying the removed dust-caps through sterilizing means, reapplying the dust-caps to the bottles prior to arrival of the latter at the capping station, telescoping skirted cover caps over the dust-caps and securing them to the bottles at the capping station.

8. The method defined in claim 7, and securing the applied cover caps and dust-caps together for ultimate removal as a unit from the bottles.

9. The method defined in claim 7, and adhesively bonding the cover caps and dust-caps together.

References Cited

UNITED STATES PATENTS

| 774,378 | 11/1904 | Carter | 53—281 |
| 859,121 | 7/1907 | Schmidt | 53—27 X |
| 901,651 | 10/1908 | Schmidt | 53—27 X |
| 1,889,629 | 11/1932 | Bohmer | 53—37 X |
| 3,255,926 | 6/1966 | Modderno | 53—36 X |
| 3,325,033 | 6/1967 | Wheaton | 53—37 X |
| 3,340,671 | 9/1967 | Loo | 53—37 |
| 3,345,798 | 10/1967 | Sternau | 53—296 X |
| 3,350,839 | 11/1967 | Carter | 53—88 |
| 3,420,033 | 1/1969 | Modderno | 53—36 |

WAYNE A. MORSE, JR., Primary Examiner

U.S. Cl. X.R.

53—37, 88, 141, 268, 281